United States Patent [19]

Kullmann et al.

[11] Patent Number: 4,842,340
[45] Date of Patent: Jun. 27, 1989

[54] BRAKE FOR A VEHICLE TRAILER

[75] Inventors: Bernhard Kullmann, Frankfurt; James Remfrey, Oberursel; Klaus Schlechtriem, Floersheim, all of Fed. Rep. of Germany

[73] Assignee: Alfred Teves GmbH, Frankfurt Am Main, Fed. Rep. of Germany

[21] Appl. No.: 184,219

[22] Filed: Apr. 21, 1988

[30] Foreign Application Priority Data

Apr. 30, 1987 [DE] Fed. Rep. of Germany ....... 3714383

[51] Int. Cl.$^4$ .......................... B60T 7/20; B60T 8/00; B60T 13/08
[52] U.S. Cl. .................................. 303/7; 188/112 R; 188/142; 188/345; 303/9.62; 303/100; 303/116; 303/119
[58] Field of Search ......................... 303/7–8, 303/47, 9.62, 9.67, 9.68, 9.72, 10–12, 13–18, 100, 113–119, 110, 93, 5, 6.01, 24.1, 48–49; 188/112 A, 112 R, 3 R, 3 H, 345, 142, 125, 149

[56] References Cited

U.S. PATENT DOCUMENTS

| | | | |
|---|---|---|---|
| 2,288,046 | 6/1942 | Stony | 188/112 |
| 2,698,069 | 12/1954 | Henry | 188/112 |
| 2,716,471 | 8/1955 | Long | 188/112 |
| 3,747,987 | 7/1973 | Henderickson | 303/7 |
| 3,771,838 | 11/1973 | Rossigno et al. | 303/7 |
| 3,951,464 | 4/1976 | Donahue et al. | 303/7 |
| 3,990,749 | 11/1976 | Mizen et al. | 188/112 X |
| 3,999,809 | 12/1976 | Inada et al. | 303/119 X |
| 4,090,738 | 5/1978 | Bray | 303/7 |
| 4,346,944 | 8/1982 | Leiber | 303/119 |
| 4,362,339 | 12/1982 | Belart | 303/117 |
| 4,453,782 | 6/1986 | Arikawa et al. | 303/119 X |
| 4,477,125 | 10/1984 | Belart et al. | 303/119 X |
| 4,478,459 | 10/1984 | Cummings | 303/7 |
| 4,578,951 | 4/1986 | Belart et al. | 303/114 X |
| 4,685,747 | 8/1987 | Belart et al. | 303/119 X |
| 4,714,296 | 12/1987 | Imoto et al. | 303/114 X |
| 4,729,611 | 3/1988 | Kircher et al. | 303/114 X |
| 4,743,075 | 5/1988 | Belart et al. | 303/119 X |

FOREIGN PATENT DOCUMENTS

| | | | |
|---|---|---|---|
| 3404929 | 6/1985 | Fed. Rep. of Germany | 188/112 R |
| 3529411 | 4/1987 | Fed. Rep. of Germany | 188/112 R |
| 2186929 | 8/1987 | United Kingdom | 188/112 R |
| 2193544 | 2/1988 | United Kingdom | 303/114 |

*Primary Examiner*—Douglas C. Butler
*Attorney, Agent, or Firm*—James B. Raden

[57] ABSTRACT

A brake slip control system for trailers equipped with overrun brakes is disclosed, in order to make the brake device independent of the towing vehicle, the pressure fluid source is arranged at the trailer.

1 Claim, 1 Drawing Sheet

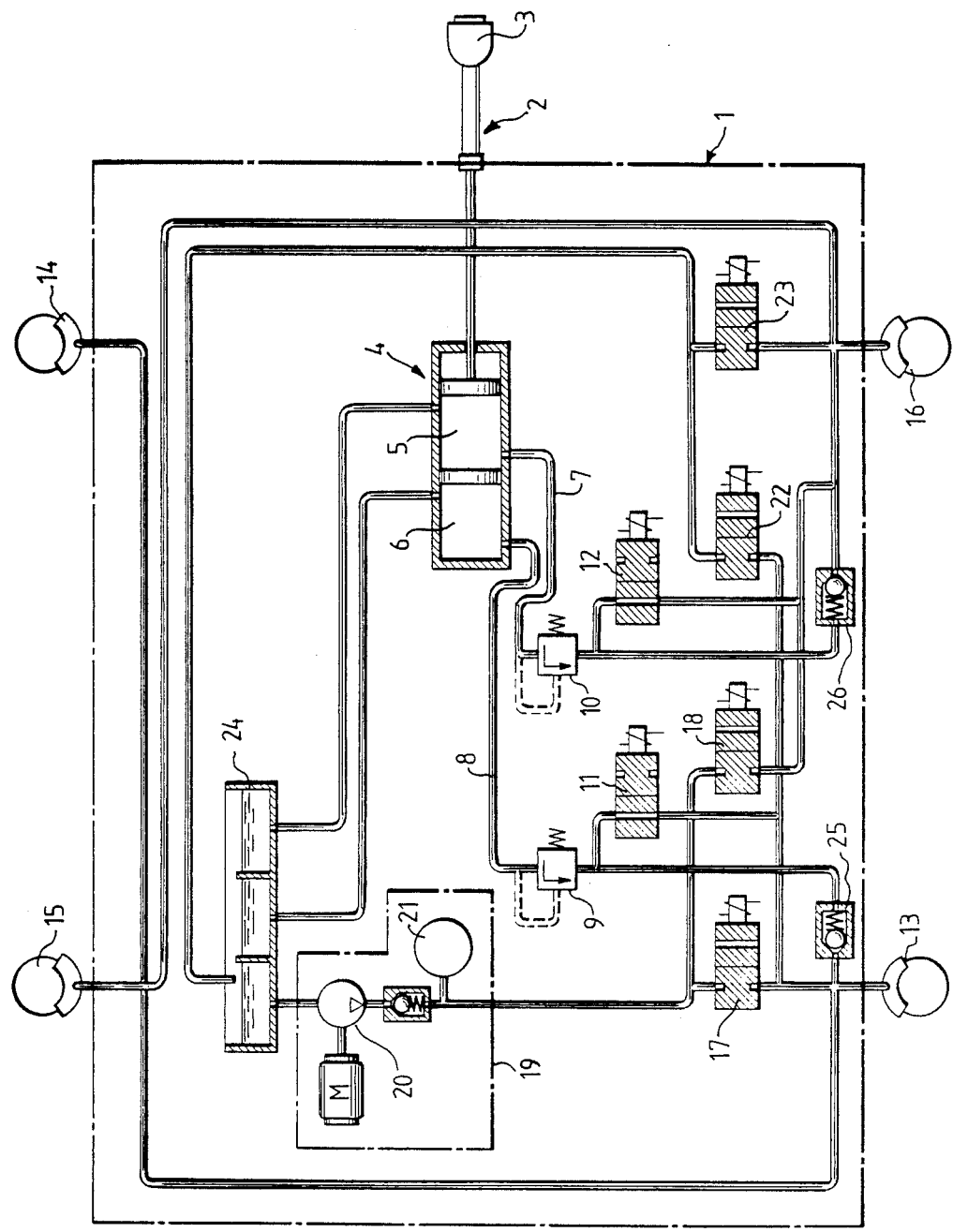

BRAKE FOR A VEHICLE TRAILER

BACKGROUND OF THE INVENTION

The present invention relates to a brake for a vehicle trailer.

In this type of trailer braking wherein drawbar force is used to generate brake forces, heretofore, the trailer wheels have had a strong tendency to lock and in particular in the event of abrupt braking operations. Upon the occurrence of an abrupt braking operation, the towed vehicle will run up to the towing vehicle so heavily that overproportionate brake forces are generated which cause locking of the wheels. This renders the towing and towed vehicles unstable and manageable by the driver only with great difficulties or not at all.

SUMMARY OF THE INVENTION

Therefore, it is the object of the present invention to increase the safety of driving a car-trailer combination consisting of a towing vehicle and a trailer with an overrun brake. According to the invention, the arrangement for achieving this object, is independent of the towing vehicle.

According to the invention, control of the rotational behavior of the trailer wheels (brake slip control) is achieved by applying and relieving pressure to the wheel brakes. The pressure required for brake slip control is made available by a pressure fluid source which is arranged at the trailer.

Preferably, the brake system is designed such that the wheel brakes are connectible individually or in pairs by way of valves either to the pressure fluid source, to a working chamber of the master cylinder or to the supply reservoir. In the absence of a slip control action, the valves will close the connection to the pressure fluid source and to the supply reservoir and will keep the connection to the working chamber open.

In the event of a slip control action, the connection to the working chamber will be closed, and the connection to the pressure fluid source and/or to the supply reservoir is alternatively opened and/or closed, depending on whether pressure relief or pressure application of the wheel brakes is to take place.

To allow the driver of the towing vehicle to discontinue the braking action in the event of slip control, the wheel brakes communicate by way of non-return valves with the working chambers of the master brake cylinder. If the brake is released by the driver, pressure reduction takes place in the working chambers which, because of the non-return valves opening, will be effected in the wheel brakes as well.

Preferably, the ratio between the drawbar forces and the brake pressures and/or brake forces is chosen to be very small so that high brake pressures will be generated in the presence of low drawbar forces. When the trailer runs up vehemently to the towing vehicle, the brake pressures will therefore rise overproportionately so that pressure-limiting valves are interposed into the brake lines in an advantageous fashion.

BRIEF DESCRIPTION OF THE DRAWING

The drawing is a diagramatic representation of a preferred brake system according to the invention.

DETAILED DESCRIPTION OF A PREFERRED EMBODIMENT

In the FIGURE, a trailer 1 is shown in dashed outline having a drawbar 2 and a clutch 3. By means of the clutch 3, the trailer 1 can be coupled to a towing vehicle not shown. The drawbar 2 acts upon a master brake cylinder 4 wherein two working chambers 5 and 6 are formed by pressure pistons. These working chambers 5 and 6 are connected by brake lines 7 and 8 to wheel brakes of the trailer 13, 14 and 15, 16, respectively.

The connection with the working chambers is controlled by valves 11 and 12 which are open when de-energized. Pressure-limiting valves 10 and 9 are provided in the brake lines 7 and 8 which are connected to working chambers 5 and 6 and limit the pressure in the brake lines 7 and 8 to a maximum value.

Further, the wheel brakes 13, 14 and 15, 16, respectively, are connected by valves 17, 18, which are closed when de-energized, with the pressure fluid source 19 that is composed of a pump 20 and an accumulator 21.

Another connection to the supply reservoir 24 is controlled by the relief valves 22, 23 which are also closed on their de-energized state.

Connected in parallel to the valves 11 and 12, which are open when de-energized, are non-return valves 25, 26 opening toward the working chambers 5, 6.

When the towing vehicle is braked, its velocity will be reduced. The trailer that is not yet braked will approach the towing vehicle, as a result whereof the drawbar 2 actuates the master brake cylinder and displaces the master brake cylinder pistons in the sense of decreasing the working chambers 5, 6. The pressure developed will be delivered to the wheel brake cylinders, whereby the wheels are braked and brake forces are built up.

If a sensor arrangement, not illustrated, detects that any one of the wheels are tending to lock, the valves 11, 12, which are open when de-energized, will switch to their closed position, whereby the connection between the working chambers and the wheel brakes is interrupted and further pressure build-up in the working chambers will not be supplied to the wheel brakes. The pressure in the wheel brakes accordingly remains on the attained level. Should this pressure not be sufficient to prevent locking of the imminently locking wheel, the corresponding relief valve 22, 23 will be opened so that pressure fluid is permitted to flow out of the wheel brake to the supply reservoir 24, and the wheel brake becomes pressure-relieved.

The imminently locking wheel is then able to re-accelerate and, after sufficient re-acceleration, by way of change-over of the corresponding valve 17 and/or 18, will be loaded again by pressure, namely by way of pressure fluid being furnished from the pressure fluid source 19 to the wheel brakes.

Should the braking operation during a slip control action be terminated by the driver, the towing vehicle will be accelerated in relation to the trailer so that the drawbar 2 is moved in the sense of increasing the working chambers 5, 6. In consequence thereof, pressure reduction is effected in the working chambers 5, 6 which, since the non-return valves 25, 26 open, is delivered further to the wheel brakes so that the slip control action is interrupted.

The pressure-limiting valves 9, 10 permit the master brake cylinder to be designed such that, in the presence of low drawbar forces, high pressures can be generated in the working chambers. On the other hand, the pressure-limiting valves 9 and 10 are provided so that the pressures in the brake lines can be limited to a reasonable amount.

What is claimed is:

1. A brake for a vehicle trailer which is adapted to be coupled to a towing vehicle by a drawbar, comprising hydraulically operated trailer wheel brakes, a dual working chamber master brake cylinder having at least one piston therein operatively connected to the drawbar to activate said master brake cylinder when the velocity of said trailer is greater than the velocity of said towing vehicle and the working chambers of said master brake cylinder being connected to the wheel brakes for controlling the rotational behavior of the trailer wheels and means for supplying and relieving hydraulic pressure to the wheel brakes during brake slip control and independently of said master brake cylinder including a pressure fluid source which is arranged at the trailer and which is connected to said wheel brakes, wherein the wheel brakes are respectively selectively connectable by a plurality of normally open and normally closed electromagnetically operated valves to the presence fluid source, to a working chamber of the master cylinder, and to a supply reservoir, wherein the wheel brakes are connectable by non-return valves to selected ones of the working chambers of the master cylinder, the non-return valves opening toward the working chambers, and wherein connected between the working chambers and the non-return valves are pressure-limiting valves which limit the pressure in the brake lines to a maximum value.

* * * * *